United States Patent [19]

Rendall

[11] Patent Number: 5,618,052
[45] Date of Patent: Apr. 8, 1997

[54] BICYCLE ATTACHMENT

[76] Inventor: Barry A. Rendall, 26 John Martin Crescent, Millgrove, Ontario, Canada, L0R 1V0

[21] Appl. No.: 491,023

[22] Filed: Jun. 15, 1995

[51] Int. Cl.$^6$ .............................. B62J 39/00; B62K 19/36
[52] U.S. Cl. ..................... 280/288.4; 70/233; 74/551.1; 74/551.3; 74/551.7; 362/72; 403/84; 403/315
[58] Field of Search ............................... 280/288.4, 201, 280/202, 727; 362/72, 75; 74/551.1, 551.2, 551.3, 551.7; 403/83, 84, 110, 315, 343, 374; 248/289.11; 70/261, 233

[56] References Cited

U.S. PATENT DOCUMENTS

| 491,578 | 2/1893 | Mercer . | |
|---|---|---|---|
| 2,532,574 | 9/1944 | Schwinn | 155/5.13 |
| 2,793,284 | 5/1957 | Simoneit | 240/7.55 |
| 3,906,443 | 9/1975 | Musselman | 340/69 |
| 4,435,983 | 3/1984 | Shimano | 73/493 |
| 4,789,176 | 12/1988 | Carroll | 280/289 |
| 4,850,733 | 7/1989 | Shook | 403/104 |
| 4,967,179 | 10/1990 | Solini | 340/432 |

*Primary Examiner*—Brian L. Johnson
*Assistant Examiner*—Victor E. Johnson
*Attorney, Agent, or Firm*—Rogers & Scott

[57] ABSTRACT

The invention provides a saddle support for use on a bicycle frame having a tubular upright with an exposed open upper end to receive the support. A tubular post is proportioned to slidably engage in the tubular upright and a clamp is coupled to a first end of the post for engagement inside the upright. The clamp includes an actuator inside the post for operation to releasably clamp the post in the upright and a saddle coupling is attached to the other end of the post. The coupling includes a base attached to the post and a top coupled to the base and adapted to be attached to a saddle. The top is moveable between a closed position where the top bars access into the post, and an open position where the top permits access into the post for a tool to operate the clamp. A lock is coupled to both the base and to the top to retain the top in the closed position to prevent unauthorized access into the post to release the clamp. The lock is operable to release the top for movement into the open position. Structure is also provided for an electrical power supply to be contained in the post to power electrical devices.

15 Claims, 4 Drawing Sheets

5,618,052

BICYCLE ATTACHMENT

FIELD OF THE INVENTION

This invention relates to vehicles such as bicycles which have a seat mounted on a post for adjustment in a frame member, and more particularly to details of the seat and post including an optional electrical supply carried within the post.

BACKGROUND OF THE INVENTION

The invention will be described specifically for use with a bicycle. However, it will be appreciated that the invention can be used on other similar structures such as multi-person bicycles, wheeled toys, etc.

Bicycles have been developed gradually over many years and generally fall into two categories, namely basic transportation and pleasure vehicles. In the former category, a lot of development has taken place revolving around comfort, safety, and including such things as advanced brakes, seats and lighting. By contrast, pleasure bicycles tend to be equipped for such pastimes as racing or cross-country travel and the demands for these vehicles are quite different. More emphasis is placed for instance in the gear systems, lightness of the vehicle and generally style and appearance.

The pleasure segment of bicycles has resulted in more innovation in recent years and so called "high-tech" techniques have become prevalent in the design of such bicycles. Aerodynamics, weight, ergonomics, and in general innovative approaches to well established parts of the bicycles such as the brakes, the handlebars, chain wheel arrangements, saddles, etc. have dominated the market in recent years. This has resulted in renewed interest in the use of bicycles of all types. Concomitant with this is an increase in cost and value of the bicycle to the extent that theft of parts of bicycles has become common place.

The use of bicycles in cities has escalated to the point where there is renewed interest in controlling the use of the vehicles particularly after dark when it is quite common to use them without lights. There is strong movement to control this use and to legislate the use of lights, reflectors and other safety devices. Although such devices have been common on bicycles used entirely for transportation, particularly in Europe, persons involved in pleasure cycling do not want to use heavy and cumbersome systems on their bicycles since this would detract from the aerodynamics, weight and general appearance of the bicycle. It is therefore desirable to provide a way of housing the batteries and related components securely and out of sight.

BRIEF DESCRIPTION OF THE INVENTION

It is one of the aspects of the present invention to provide a seat support which minimizes the risk of theft of the saddle from the bicycle. Accordingly a saddle support is provided having a tubular post including a clamp operated internally of the post to lock the post in a bicycle frame. At the top of the post a saddle support is provided which can be locked to bar access into the post thereby securing the post.

In another of its aspects a saddle support is provided for attachment to a saddle post and including a lock to bar access to the structure used to attach the saddle so that the saddle can not be removed by unauthorized persons.

In still another of its aspects the invention provides an electrical supply stored in a seat post for use to power auxiliary devices such as lights.

BRIEF DESCRIPTION OF THE DRAWINGS

The invention will be better understood with reference to the following description taken in combination with the drawings in which.

DESCRIPTION OF THE PREFERRED EMBODIMENT

Figure 1:
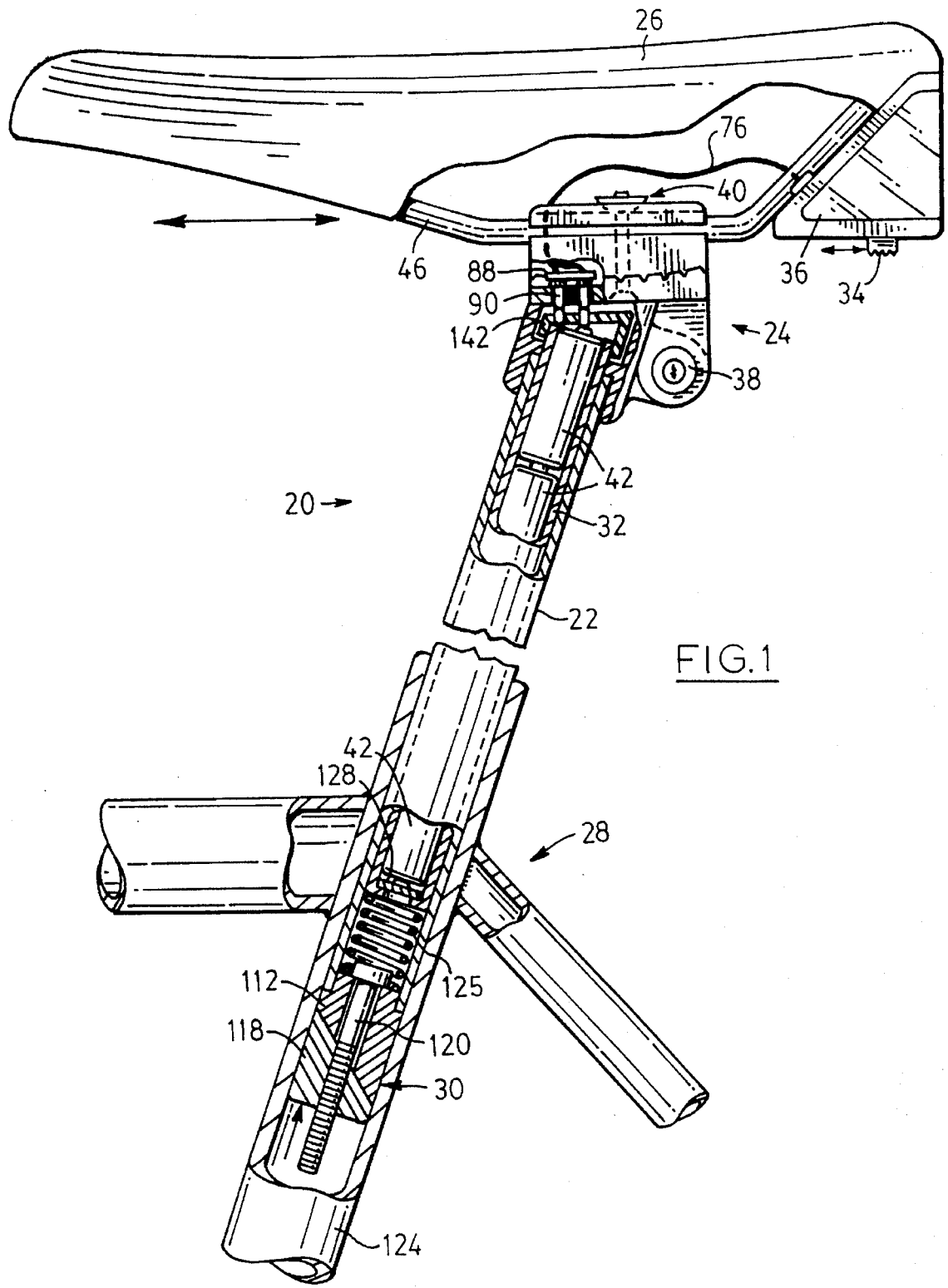
FIG. 1 is a side view, mostly in section, of a saddle support according to the invention mounted in a conventional bicycle frame and carrying a saddle which optionally includes a rear light fixture.

Reference is first made to FIG. 1 which illustrates a saddle support in accordance with the preferred embodiment of the invention and designated generally by the numeral 20. The support consists essentially of a tubular post 22 which is attached at its upper end (as drawn) to a saddle coupling 24 on which a saddle 26 is mounted. The post is adjustably engaged in a conventional bicycle frame 28 and held in place by a clamp 30 as will be explained. Because the post 22 is hollow, it can accommodate an electrical power supply 32 which, in this embodiment, can be operated through a saddle mounted switch 34 to operate a light fixture 36 arranged to be illuminated both at the back and to both sides of the saddle.

The saddle coupling 24 includes a barrel lock 38 to permit the saddle to be tipped rearwardly (see FIG. 3) thereby providing access to an adjustment bolt 64 for adjusting the position of the saddle on the coupling 24, and also to the electrical power supply 32 so that it can be withdrawn upwardly to replace batteries 42 as required. Further, once the power supply is removed, the clamp 30 is available for adjustment. These details will become more evident with reference to subsequent drawings.

For the moment it is sufficient to recognize that a saddle support is provided which both provides a power supply for a saddle such as that shown, and provides a security arrangement so that the saddle can not be removed either by withdrawing the complete assembly, or by removing the saddle independently. This is because the lock 38 must be operated to gain access to the bolt assembly 40 to remove the saddle independently, or to the clamp 30 to remove the complete assembly. There is therefore two aspects to the invention. The first is to provide a security aspect which reduces the risk of theft of the saddle and seat post and the second is an assembly which includes an electrical supply. At the same time, the user who has the key to the lock 38 has access to the parts readily by operating the lock 38.

Figure 2:
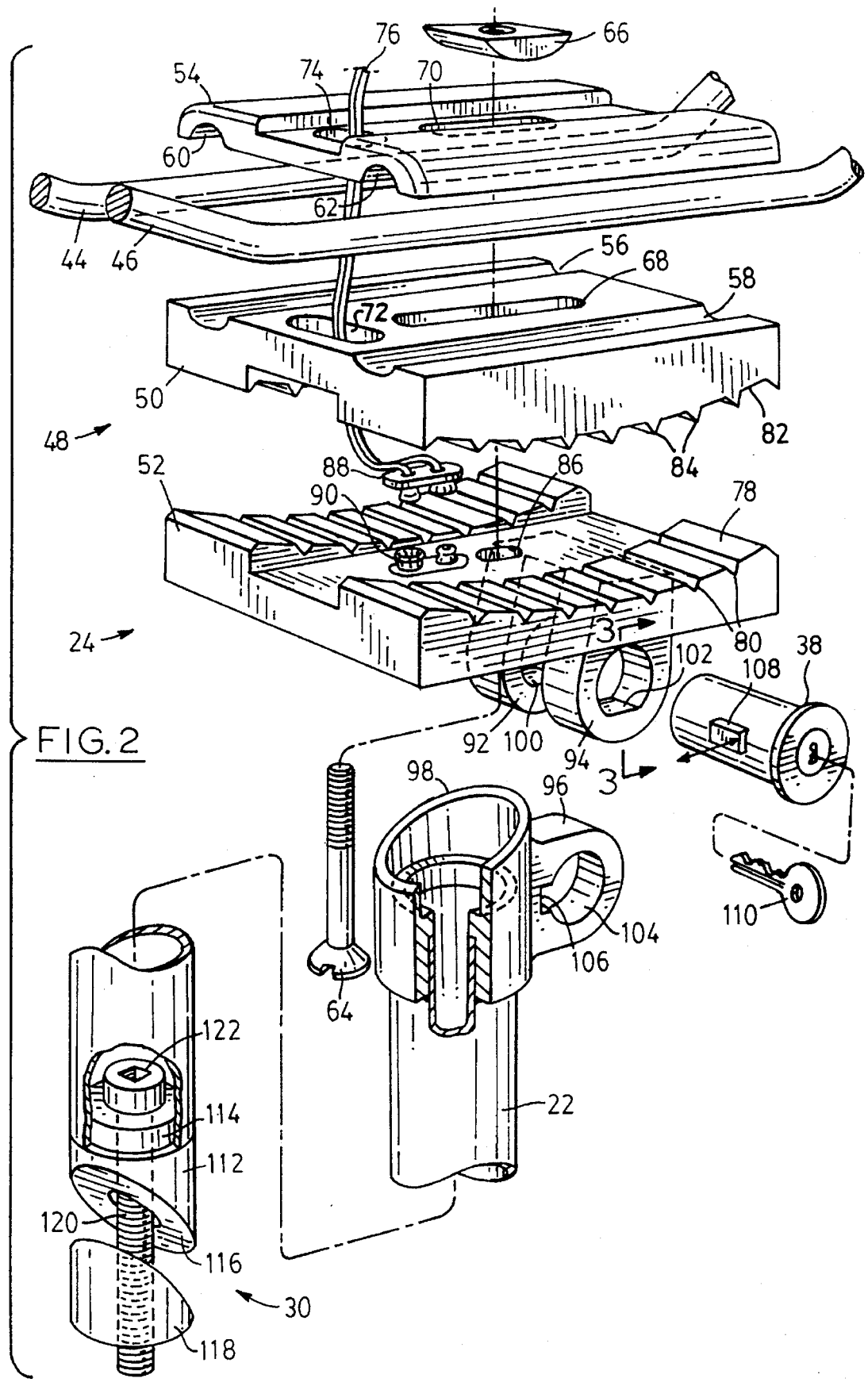
FIG. 2 is an exploded perspective view drawn to a larger scale than FIG. 1 and showing parts of the saddle support and in particular, parts of a saddle coupling forming part of the support.

Reference is next made to FIG. 2 to more fully describe the saddle coupling 24. In this figure, the electrical components have been omitted to simplify drawing and to enhance the description of the other parts.

Adjacent the top of FIG. 2, a pair of elements 44, 46 are shown and these are conventionally found on the underside of the saddle. They are arranged in parallel so that there is a limited fore and aft movement available to adjust the position of the saddle. On assembly, these elements are accommodated between a base 48, made up of an upper part 50 and a lower part 52, and a top 54. The top is shaped to have a pair of parallel recesses 56, 58 which are generally semi-circular and complement the positions and shapes of the elements 44, 46. Similarly, the top 54 has downwardly facing parallel recesses 60, 62 to combine with the corresponding recesses 56, 58 to trap the elements 44, 46 in place. The upper part 50 and top 54 are drawn together to frictionally engage the elements 44, 46 by a bolt 64 cooperating with a nut 66 as will be described.

The upper part 50 and top 54 define respective elongate slots 68, 70 to accommodate the bolt and provide adjustment as will be described with reference to FIGS. 4 to 6.

The upper part 50 and top 54 also include apertures 72, 74 which provide space to run an electrical cable 76 forming part of the electrical system which will be described later.

The base 48 is designed to provide adjustability for tilting the saddle. How this is done will be described later but for the moment the details of the parts will be described. The lower part 52 defines an upper concave surface 78 which is interrupted by equally spaced serrations 80 running parallel with one another. The curvature extends fore and aft of the bicycle when the assembly is completed and the serrations are transverse to this direction. On the upper part 50, a convex surface 82 is provided which complements the concave surface 78 and the convex surface is interrupted by a series of ribs 84 shaped and spaced to fit in the serrations 80. Consequently, the upper and lower parts can be brought together in a series of positions spaced one from another by the distance between the serrations in the part 52.

The lower part 52 accommodates the bolt 64 in an elongate slot 86 so that with the bolt through this slot and the through slots 68 and 70 in the other parts, the nut 66 can be engaged. When the bolt is tightened, the relative positions of the upper and lower parts 50, 52 are set and the elements 44, 46 of the saddle are frictionally locked between the upper part 50 of the base 48 and the top 54 after adjustment longitudinally.

The lower end of the electrical cable 76 is drawn in FIG. 2 and includes a bi-polar female snap fitting 88 for engagement on a corresponding bi-polar fitting 90 which is mounted in the lower part 52 with suitable insulation. The electrical circuit will be more fully described later.

The underside of the lower part 52 of the base 48 includes a pair of similar bosses 92, 94 spaced from one another by the width of a boss 96 forming part of an end piece 98 permanently attached to the upper end of the tubular post 22.

The bosses 92, 94 include generally circular openings with respective chordal flat portions 100, 102. The barrel lock 38 has a body shaped to fit within these opening so that there is no likelihood of the lock rotating within the bosses 92, 94. By contrast, an opening 104 in the boss 96 is essentially round with a slot 106 formed in the wall. This slot is shaped to accommodate a bolt 108 forming part of the lock 38. Consequently, when a key 110 is operated in the lock, the bolt projects into the slot 106 so that the barrel of the lock 38 can not rotate. The boss 96 is then locked to the barrel and is therefore prevented from rotating. On the other hand, if the key is operated to withdraw the bolt 108, then the complete assembly above the end piece 98 can rotate using the barrel lock 38 as a pivot pin within the opening 104. This permits movement of the type illustrated in FIG. 4 and which will be described later.

FIG. 2 also shows the lower end of the post 22. This end is furnished with the clamp 30 which is made up of a first part 112 having a cylindrical projection 114 fixed within the post 22. At the bottom end of the upper part 112, an angled wall 116 is provided to complement a similar wall on a barrel nut 118. An actuator in the form of a bolt 120 is free to rotate in a clearance opening in the upper part 112 and is threadably engaged in the barrel nut 118. As a result, when the bolt is operated using a driver which fits into a recess 122 in the head of the bolt, there is a wedging action between the angled walls and as the barrel nut 118 is drawn upwardly the wedging action causes misalignment of the nut with the upper part 112. This misalignment causes frictional engagement within the wall of a tubular element 124 (FIG. 1) of the bicycle frame 28. This type of clamp is known in the art and has proven to be very successful, particularly for locking bicycle handle bars in position. The method of use of the clamp 30 will be described more fully with reference to FIGS. 4 to 6.

Figure 3:
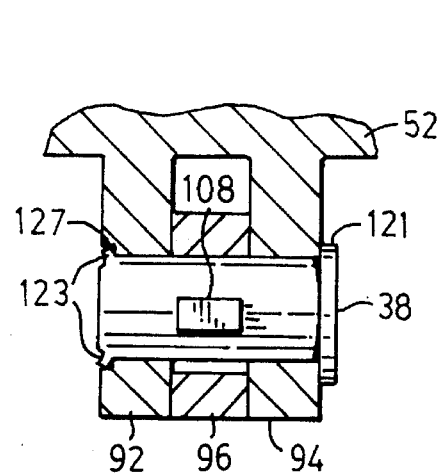
FIG. 3 is a sectional view on line 3—3 of FIG. 2 and illustrating the engagement of a lock as part of the saddle support.

One further detail of the saddle support is shown in FIG. 3. This is a cross-section which shows the barrel lock 38 inside the bosses 92, 94 and 96. The lock has an outer rim 121 to locate one end of the lock, and at the other end the body of the lock is deformed at intervals about the periphery to create barbs 123 to engage in a peripheral recess 125 to prevent removal of the lock.

Figure 4:
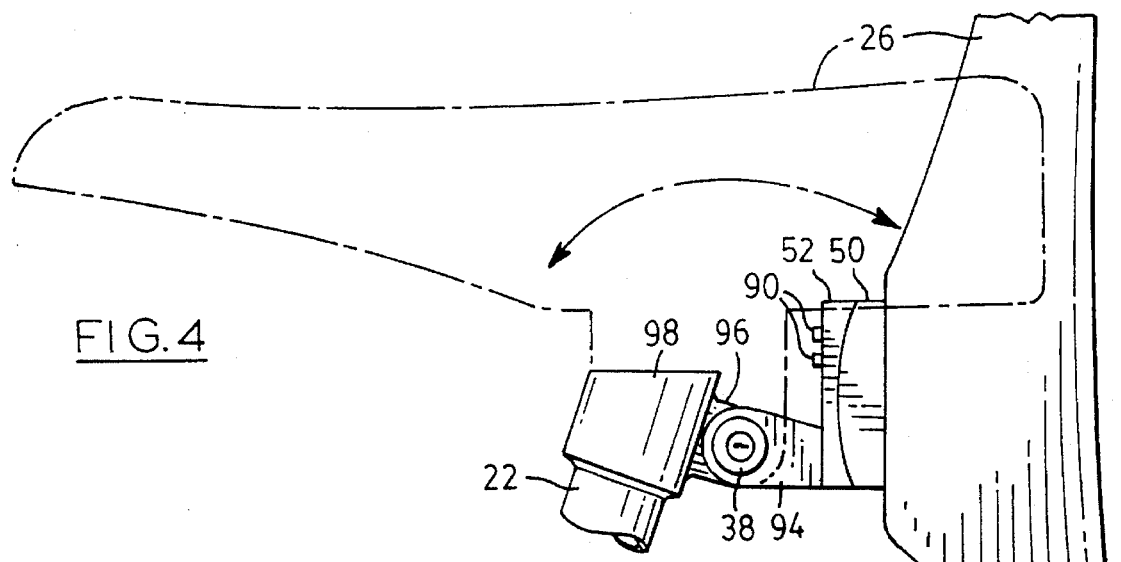
FIGS. 4, 5 and 6 are side views with portions broken away to illustrate possible movement of the saddle on the saddle support to facilitate adjusting the saddle and showing two positions of the saddle after adjustment.

Reference is next made to FIG. 4 which is a simplified view of the structure illustrating the saddle 26 tipped out of its normal positioned about the lock 38 as was described previously. This provides access both to the bolt 64 (FIG. 2) used to adjust the saddle position, and also to the electrical power supply 32 which can be removed simply by withdrawing it upwardly out of the post 22. Once this is done, access is then provided to the bolt 120 (FIGS. 1 and 2). An elongate tool is used to enter the recess 122 in the head of the bolt so that the bolt can be released thereby undoing the clamp and permitting adjustment or removal of the post 22.

It will now be evident that the use of the key 110 (FIG. 2) in the lock 38 allows the user to move the base (and hence the saddle) between a closed position barring access to the parts needed for adjustment, and an open position so that adjustments and maintenance can be done. Without the key, no unauthorized user can remove the saddle, the post, or any of the parts.

Figure 5:
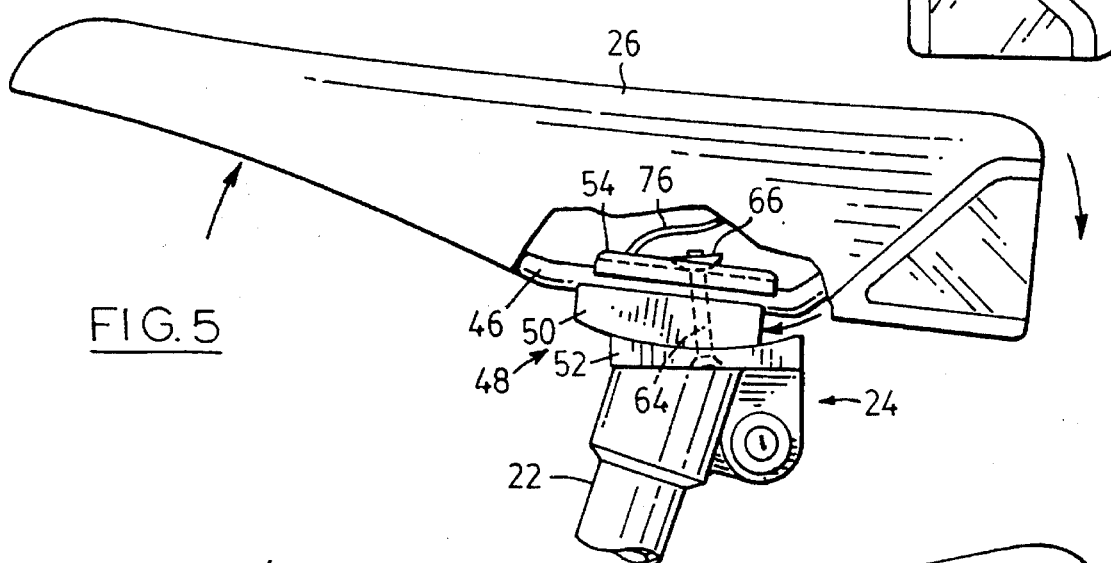
Figure 6:
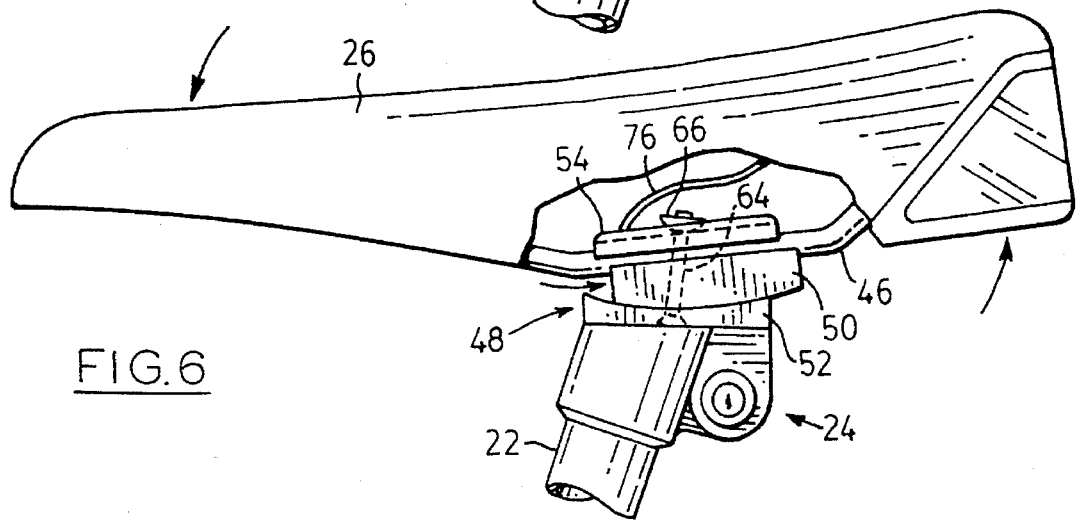

FIGS. 5 and 6 illustrate the adjustability of the saddle longitudinally with respect to the saddle coupling 24. First of all the saddle would be put in the position shown in FIG. 4 and the bolt 64 undone. The saddle can then be slid fore and aft to a limited amount and provided that the bolt is released sufficiently, the upper and lower parts 50, 52 of the base 48 can be disengaged and moved into a new position. For instance, in FIG. 4 the upper part has been moved forwardly and this is accommodated by the curved shape of the nut 66 on the bolt 64 and by the clearance slots provided in the various parts. Once the bolt is tensioned, the saddle takes on a position shown in FIG. 5 with the nose of the saddle elevated. This contrasts with FIG. 6 in which the upper part 50 has been moved rearwardly and as a result, the saddle has been tilted to lower the nose of the saddle. Positions between these two extremes are of course possible, limited only by the need to engage the ribs 84 (FIG. 2) in the corresponding serrations 80. The number of positions can be altered by changing the spacing between the serrations and corresponding ribs.

Figure 7:
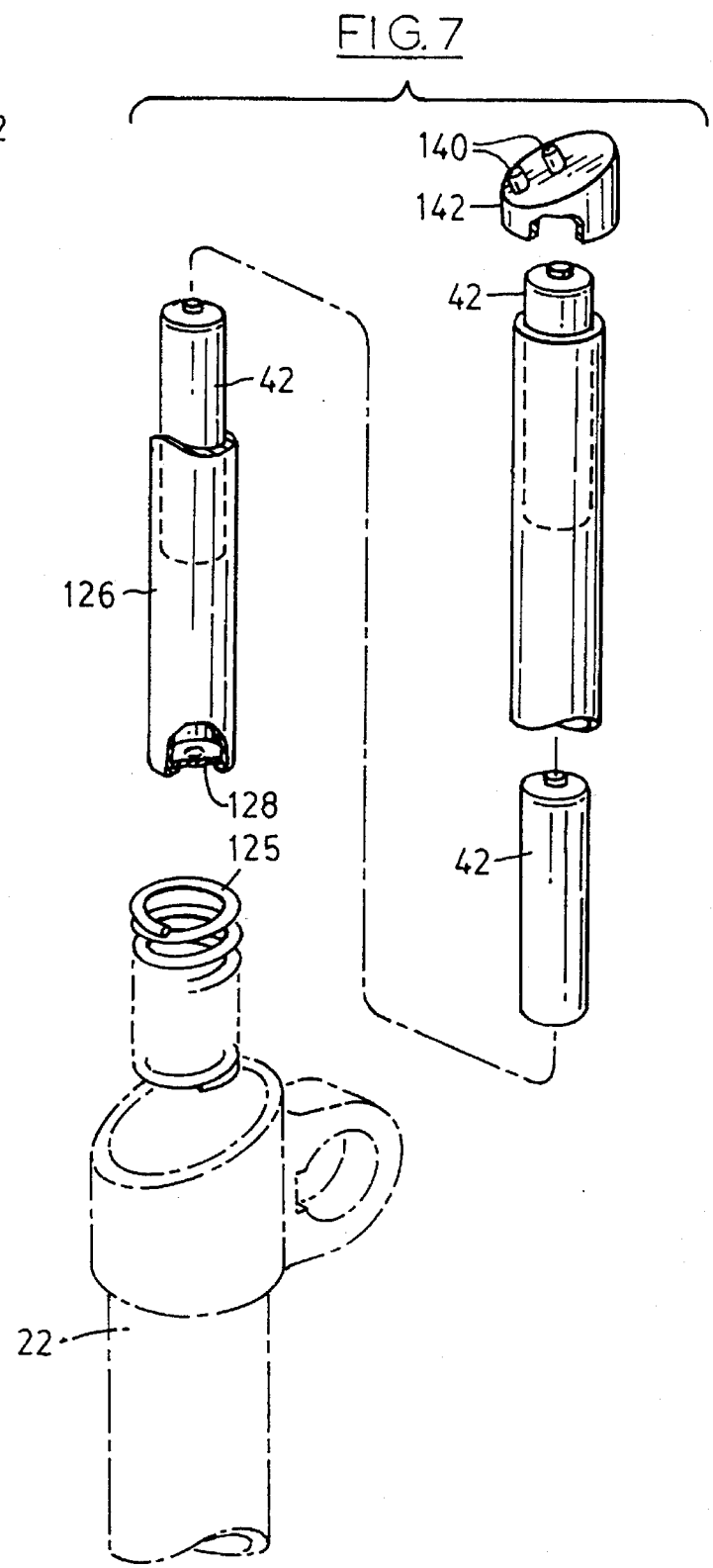
FIG. 7 (drawn adjacent FIG. 3) is an exploded perspective view of portions of the saddle support forming an electrical power supply.

Reference is next made to FIG. 7 to describe the power supply 32 and electrical circuit associated with the light fixture 36.

As seen in FIG. 7 (with reference also to FIG. 1) the power supply fits within the post 22 and includes at its lower end a compression spring 124 which sits on the exposed upper surface of the clamp 30 and supports at its upper end a conductive sleeve 126 which has a rolled bottom lip to trap within the sleeve a conductive disk 128. This disk is dimpled at the centre for better contact with an adjacent battery 42. The spring serves two purposes: firstly to maintain good electrical contact; and secondly to push the conductive sleeve 126 upwardly when the lock 38 is opened and the seat is tilted into the FIG. 4 position. This allows the user to withdraw the sleeve 126 with the batteries 42 for service.

The length of the post 22 and the sleeve 126 will depend upon how many batteries are to be stored. This is a matter of design and will depend upon the voltage required to drive the auxiliary device such as the light fixture 36.

The negative pole of the battery stack contacts the conductive disk 128 which in turn is in contact with the conductive sleeve 126. Consequently, at the upper end of the power supply the centre or positive pole of the adjacent battery 42 is exposed centrally and at the perimeter the upper edge of the sleeve 126 is available to contact the opposite pole. The fitting 90 previously described with reference to the lower part 52 of the base 48 (FIG. 2) can also be seen in FIG. 1. This fitting rests against connectors 140 set in an elastomeric sealing cap 142 moulded to fit snugly about an upper end of the sleeve 126. The connectors are in contact respectively with the centre pole of the battery and with the sleeve 126. This completes a circuit when the seat is in the normal position for use but allows the seat to be tilted without interference. As a result, when in use, the user can operate the switch 34 to illuminate the light fixture 36.

It will be evident that the invention can take many forms consistent with the scope of the invention as described and claimed. For instance, the electrical supply can be used for any convenient purpose including electronic devices, radios, timers, etc. Also, the exact forms of the structure used are exemplary and can be modified within the scope of the invention.

I claim:

1. A saddle support for use on a bicycle frame having a tubular upright with an exposed open upper end to receive the support, the support comprising:

a tubular post proportioned to slidably engage in said tubular upright, the post having first and second ends;

a clamp coupled to said first end of the post for engagement inside the upright, the clamp including an actuator inside the post for operation to releasably clamp the post in the upright;

a saddle coupling attached to the second end of the post and including a base attached to the post and a top pivotally attached to the base and adapted to be attached to a saddle, the top being pivotally moveable between a closed position where the top bars access into the post, and an open position where the top permits access into an opening at a top of the post for a tool to operate the clamp; and a lock coupled to both the base and the top of the saddle coupling to retain the top in the closed position to prevent unauthorized access into the post to release the clamp, the lock being operable to release the top for pivotal movement into the open position.

2. A saddle support as claimed in claim 1 in which the lock is a barrel lock and said pivotal movement of said top takes place about the lock.

3. A saddle support as claimed in claim 1 in which the base and top are shaped to receive a pair of parallel elements on the seat to permit longitudinal adjustment of the elements and seat relative to the saddle coupling.

4. A saddle support as claimed in claim 1 in which the base comprises upper and lower parts, the parts having complementary curved surfaces in contact with one another and moveable relative to one another to change the angle of tilt of the seat.

5. A saddle support as claimed in claim 4 in which the curved surfaces have respective ribs and serrations for engagement to prevent slippage.

6. A saddle support as claimed in claim 1 and further comprising an electrical power supply stored in the post.

7. A saddle support for use on a bicycle frame having a tubular upright with an exposed open upper end to receive the support, the support comprising:

a tubular post proportioned to slidably engage in said tubular upright, the post having first and second ends;

a clamp coupled to said first end of the post for engagement inside the upright, the clamp including an actuator inside the post for operation to releasably clamp the post in the upright;

an electrical power supply contained in the post and having first electrical contacts;

a saddle coupling attached to the second end of the post and including a base attached to the post and a top pivotally attached to the base and having second electrical contacts, the top being adapted to be attached to a saddle and being pivotally moveable between a closed position where the top bars access into the post and brings the first and second contacts into engagement for electrical continuity, and an open position which breaks the electrical continuity and permits access into an opening at a top of the post for a tool to operate the clamp; and a lock coupled to both the base and the top of the saddle coupling to retain the top in the closed position, the lock being operable to release the top for pivotal movement into the open position.

8. A saddle support as claimed in claim 7 in which the lock is a barrel lock and said pivotal movement of said top takes place about the lock.

9. A saddle support as claimed in claim 7 in which the base and top are shaped to receive a pair of parallel elements on the seat to permit longitudinal adjustment of the elements and seat relative to the saddle coupling.

10. A saddle support as claimed in claim 7 in which the base comprises upper and lower parts, the parts having complementary curved surfaces in contact and moveable relative to one another to change the angle of tilt of the seat.

11. A saddle support as claimed in claim 10 in which the curved surfaces have respective ribs and serrations for engagement to prevent slippage.

12. Equipment for use on a bicycle, the equipment comprising:

a saddle support having a tubular post including a clamp on one end of the post to adjustably engaged the post inside an open ended tube of a bicycle frame, and a seat support attached to an other end of the post;

an electrical power supply contained inside the post above the clamp;

a saddle;

an electrical device; and an electrical circuit connecting the electrical device to the power supply and operable to activate the device.

13. Equipment as claimed in claim 12 in which the saddle support includes a base attached to the post and a top pivotally attached to the base for movement of the top between an open position providing access into the post and a closed position to bar access into the post.

14. A saddle support for use on a bicycle frame having a tubular upright with an exposed open upper end to receive the support, the support comprising: a tubular post proportioned to slidably engage in said tubular upright, the post having first and second ends; a clamp coupled to said first end of the post for engagement inside the upright, the clamp including an actuator inside the post for operation to releasably clamp the post in the upright; a saddle coupling attached to the second end of the post and including a base attached to the post and a top pivotally attached to the base and adapted to be attached to a saddle, the top being moveable between a closed position where the top bars access into the post, and an open position where the top permits access into an opening at a top of the post for a tool to operate the clamp; and a lock coupled to both the base and the top of the saddle coupling to retain the top in the closed position to prevent unauthorized access into the post to release the clamp, the lock being operable to release the top for movement into the open position.

15. A saddle support for use on a bicycle frame having a tubular upright with an exposed open upper end to receive the support, the support comprising: a tubular post proportioned to slidably engage in said tubular upright, the post having first and second ends; a clamp coupled to said first end of the post for engagement inside the upright, the clamp including an actuator inside the post for operation to releasably clamp the post in the upright; an electrical power supply contained in the post and having first electrical contacts; a saddle coupling attached to the second end of the post and including a base attached to the post and a top coupled to the base and having second electrical contacts, the top being adapted to be attached to a saddle and being moveable between a closed position where the top bars access into the post and brings the first and second contacts into engagement for electrical continuity, and an open position which breaks the electrical continuity and permits access into an opening at a top of the post for a tool to operate the clamp; and a lock coupled to both the base and the top of the saddle coupling to retain the top in the closed position, the lock being operable to release the top for movement into the open position.

* * * * *